United States Patent [19]
Kriz

[11] 4,455,451
[45] Jun. 19, 1984

[54] DIGITIZER TABLET

[75] Inventor: John S. Kriz, Kensington, Md.

[73] Assignee: Perq Systems Corporation, Pittsburgh, Pa.

[21] Appl. No.: 397,175

[22] Filed: Jul. 12, 1982

[51] Int. Cl.³ ............................................. G08C 21/00
[52] U.S. Cl. ..................................... 178/18; 178/19
[58] Field of Search ...................... 178/18, 19, 20, 87; 33/1 M

[56] References Cited

U.S. PATENT DOCUMENTS

| | | | |
|---|---|---|---|
| 4,213,005 | 7/1980 | Cameron | 178/18 |
| 4,368,352 | 1/1983 | Davis | 178/19 |

Primary Examiner—Stafford D. Schreyer
Attorney, Agent, or Firm—Weingarten, Schurgin, Gagnebin & Hayes

[57] ABSTRACT

A digitizer tablet providing accurate two-dimensional coordinate location of the position of a cursor over the entire surface of the tablet. The position values are derived from sequential pulse signals eminating from a grid matrix within the plane of the tablet and received by a magnetic pickup within the cursor body. The grid matrix is energized with signal pulses and arranged in a predistorted manner to extend the useful area of the tablet to include the edge of the grid matrix. Furthermore, the tablet matrix and the associated drive and calculating electronics are incorporated on a unitary circuit board wherein the electronics are within the tablet area useable for cursor location determination.

27 Claims, 13 Drawing Figures

DIGITIZER TABLET

FIELD OF THE INVENTION

This invention relates to apparatus providing a two-dimensional coordinate location of a movable cursor and in particular to digitizer tablets providing location sensing from periodic electromagnetic fields eminating from the plane of the tablet.

BACKGROUND OF THE INVENTION

Digitizer tablets incorporating radiating magnetic fields have generally used two orthogonal arrays of conductors to form a grid matrix below the plane of the tablet, each array having the conductors disposed at precise regular intervals. Each array is energized by a periodic signal to produce a radiated field which is then received by a sensor within a movable cursor. The sensor position is determined by the comparison of the periodic signal energizing each array and the signal produced by the sensor. Since the magnetic field detected by the sensor is substantially different at the central area of each array, as compared to the magnetic field detected at the peripheral areas of the respective array, many digitizer tablets have restricted the area over which the sensor position may be accurately determined to a relatively small portion of the total grid matrix.

In digitizer tablets, each array conductor is energized by a periodic signal to produce a moving plane wave. The plane wave is produced by energizing an array first conductor for a specified period of time. When the first conductor is de-energized, the next adjacent array conductor is simultaneously energized for the same specified period of time; thereafter, when that conductor is de-energized, the subsequent conductor is simulatneously energized, and so forth. Other implementations have energized two or more adjacent conductors simultaneously. Regardless of the number of conductors simultaneously energized, the result of producing a plane wave by de-energizing one conductor while simultaneously energizing the other conductor results in the partial cancellation of the magnetic field by the collapsing field of the preceding de-energized conductor. In tablets having this partial cancellation of the magnetic field, extra circuit complexity is necessary to use the associated sensor pickup. Furthermore, inaccuracy in sensor position determination, especially near the tablet edge, is incurred. Other approaches used in digitizer tablets include complex filters used to condition the sensor signal according to the fixed magnetic field pattern resulting from the regular interval spacing of the array conductors, energizing the array conductor with high frequency alternating current signals, frequency modulating the high frequency current signals and redesigning the sensor. The result of these techniques is a physically large tablet (sometimes having several separate assemblies) having unnecessary complexity and critical elements.

SUMMARY OF THE INVENTION

The digital tablet according to the present invention provides accurate positioning coordinate information over substantially the entire tablet surface. The high degree of tablet utilization is provided by a signal field radiated from a tablet grid whose grid arrangement is predistorted, resulting in a larger useful tablet surface over which the cursor sensor or pickup position may be accurately determined. Furthermore, the grid energizing signals for the tablet grid peripheral wires are different from the energizing signals of the central area of the tablet to produce a correspondingly different radiated magnetic field. Moreover, the entirety of the tablet grid drive and sensor circuitry is located on the printed circuit board within the area over which the sensor may be moved to produce useful coordinate signals.

In the present embodiment, the magnetic field produced is a pulsed field having a duty cycle of approximately 50% and a constant pulse rate. The field is received by a movable cursor sensor comprising an inductive pickup. To provide good signal sensitivity and substantial immunity to electrical noise produced in the environment of the tablet, the cursor sensor used in the present invention is connected to a filter to pass the lower frequency sensor signal resulting from the magnetic field pulse emanating from the tablet grid. Specifically, the sensor signal filter is formed by a broadly resonant filter including the inductance of the sensor wherein the resonant frequency corresponds approximately to the pulse rate of the magnetic field created.

The signal from the pickup is thereafter amplified and synchronously detected relative to the periodic grid energizing signals which successively and cyclically energize each grid array. The amplitude and polarity of the synchronous detector (pulsating DC) output is directly related to the position of the sensor to the grid. Specifically, assuming the sensor to be approximately centrally placed on the grid, as conductors successively closer to the sensor are energized, the detector output will increase from zero (or a reference level) to a maximum voltage. When the first conductor on the other side of the sensor is energized, the detector output polarity changes. Thereafter, as conductors successively more distant from the sensor become energized, the detector output diminishes toward zero (reference level). Since there are a finite number of grid conductors in the tablet system, and the pickup is sufficiently sensitive, the sensor (and therefore the detector) output may not actually equal zero volts when the most distant conductors are energized. The digitizer tablet determines each array coordinate location in direct relation to the time between the initial array conductor energization and the change in detector output polarity.

The tablet according to the present invention accurately determines the point in the change in detector output polarity by first interpolating the synchronous detector pulsating DC output signal with a low-pass filter. The low-pass filter has a frequency roll-off point below the grid energizing pulse rate. Next, the polarity change is detected by comparison to a zero (reference) level, producing a comparison output signal when the zero level is traversed. The comparison output signal is then related to the first energized grid conductor by counting intervening time (clock) pulses, providing a number proportional to the sensor position.

An improvement in the coordinate accuracy of the interpolating low-pass filter output is provided by multiply energizing the peripheral grid conductors. Multiply energizing the peripheral grid conductors causes the interpolating lowpass filter output to appear to result from a grid which extends beyond the actual peripheral of the matrix. The accuracy of calculated tablet coordinate values for cursor position near the matrix periphery is significantly improved.

BRIEF DESCRIPTION OF THE DRAWING

The objects, features and advantages of this invention will be better understood from the description and claims which follow, taken together with the appended drawing wherein:

DETAILED DESCRIPTION OF THE INVENTION

Figure 1:
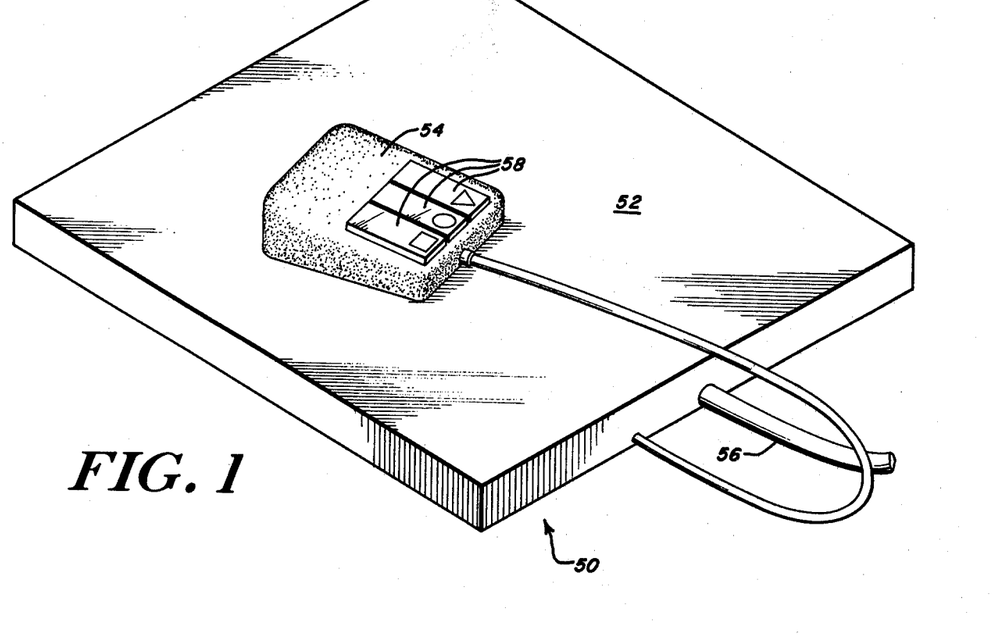
FIG. 1 is a perspective view of the tablet.

The tablet 50 shown in FIG. 1 includes a tablet pad 52 having a rectangular surface area, although other shapes and corresponding grid configurations can be implemented. A cursor or position pickup 54 is movable over the entire surface of the pad 52. The encoding and decoding electronics within the tablet 50 produce position data output for the cable 56 as well as receiving a communication clock signal and power. The cursor 54 includes a plurality of pushbuttons 58 or other controls to be actuated by the operator. The actuation of one or all of the pushbuttons will be reported in the data transmitted over the cable 56. The data received from the tablet is thereafter processed by external equipment typically a computer (not shown) which may have a viewing device.

The resulting coordinate information is transmitted to the receiving apparatus (not shown) in any one of several formats. The preferable format is a packed (compressed) serial data format encompassing any one of known serial data formats generally known in the art and not discussed here.

Figure 2:
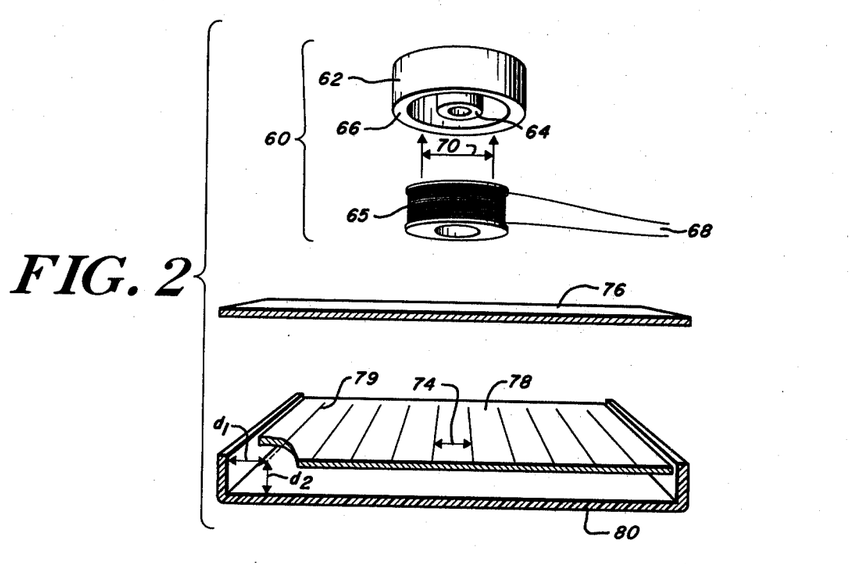
FIG. 2 is an exploded view of a section of the tablet and sensor showing the relative location of the sensor pickup, grid and support.
Figure 7:
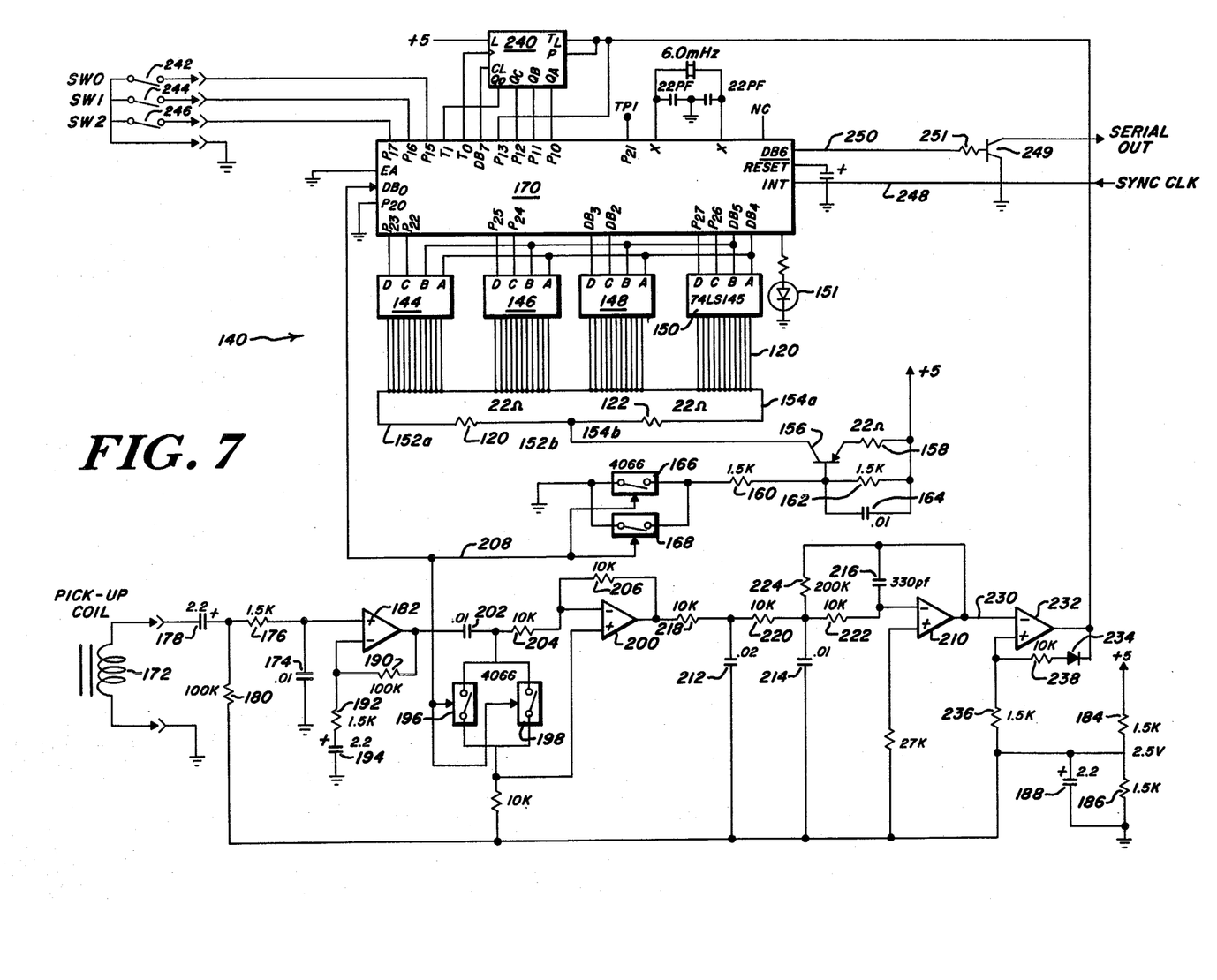
FIG. 7 is a schematic drawing of the tablet driver and decoder circuitry.
Figure 8:
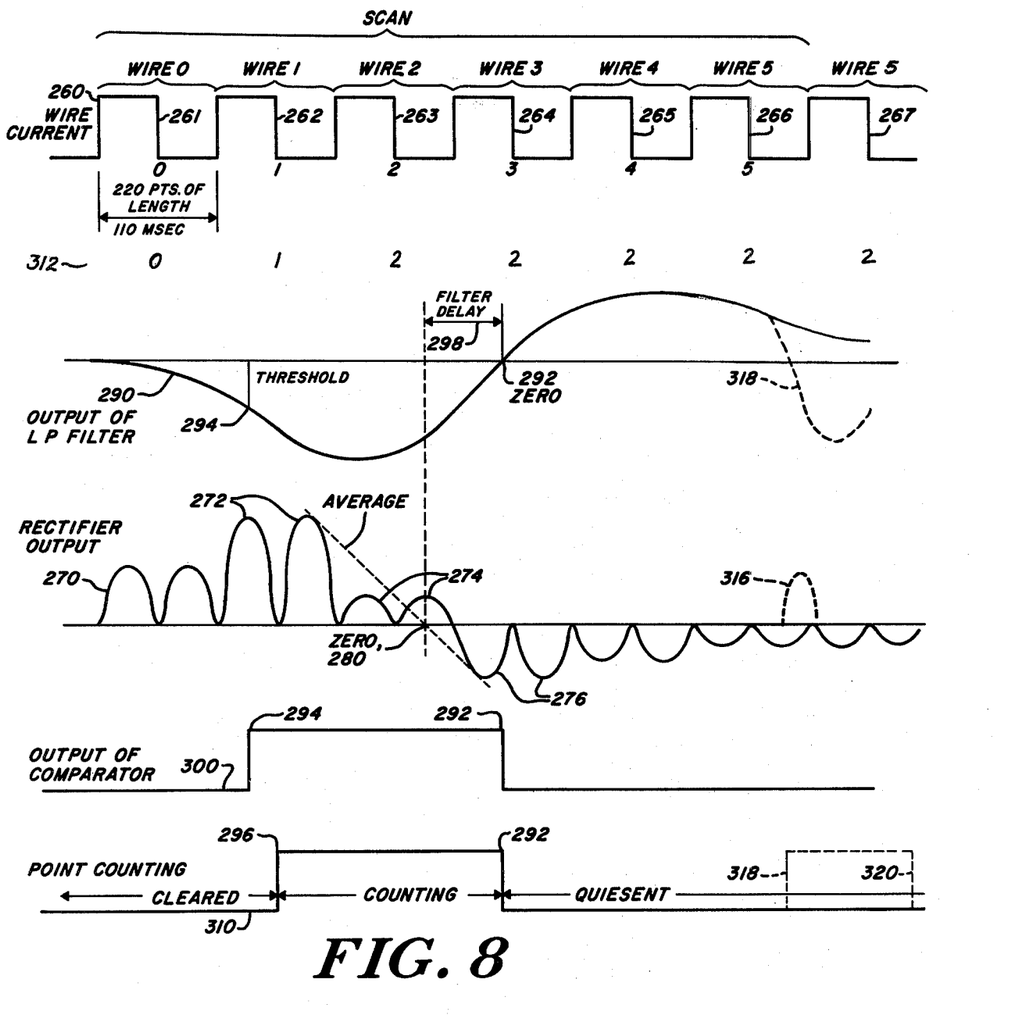
FIG. 8 is a timing diagram of signals within the tablet circuitry.

In operation, the digitizer tablet of the present invention compares a conditioned sensor signal to the signal used to energize the grid matrix, from which a two-dimensional coordinate pair is calculated as discussed in regard to the circuit and signals of FIG. 7 and FIG. 8. The cursor 54 comprises a magnetic pickup 60 including a coil wire 65 whose axis is perpendicular to the plane of the tablet pad. The physical relationships between the the sensor elements and the tablet pad are shown in FIG. 2. The coil of wire 65 resides within a magnetic core 62 commonly known as cup core, to provide a lower reluctance path between a central pole 64 and a concentric outer pole 66. The coil 65 resides within the cup core 62 such that the flux flowing through the inner 64 and outer 66 poles effectively induce a voltage in the coil and through the leads 68. The preferred diameter of the opening 70 which receives the pickup coil is somewhat greater than the wire grid 72 spacing 74. The tablet surface 76 intervenes between the pickup sensor 60 and the grid 72 plane. The grid 72 and supporting surface 78 typically comprises a printed circuit board, further discussed below. A plane of magnetic material, typically steel is mounted behind the grid plane printed circuit board 78 and curved upward along the circuit board edge, to localize the magnetic field by the grid wires to the immediate vicinity of the sensor core 62, as well as to reduce the influence of signals from other grid wires more distant to the sensor 60 location and for interfering signals external to the tablet. In particular, the steel plane 80 forms a tablet support which is curved upward to partially surround the grid support 78. The preferred horizontal distance $d_1$ between peripheral wire 79 and support 80 is approximately equal to the vertical distance $d_2$ between peripheral wire 79 and support 80.

While the use of the cup core of 62 and the steel support of 80 also increases the sensitivity of the combination of the pickup and the grid to detect the created magnetic field, the present invention is operable with the coil and the grid 72 used without the cup core 62 or the support 80.

The magnetic field detected by the cursor 52 of FIG. 1 is created by a selectively pulsed grid conductor from among two generally orthogonal arrays of conductors. The detected magnetic field corresponds fairly uniformly to the sensor position in the center of the grid matrix. According to the present invention the uniformity is extended to the peripheral areas of the tablet by providing a balanced current distribution along the grid matrix peripheral drive connections. Generally, the grid conductors have a common end which is connected to one of two conductors which connect the grid connector to the appropriate driver and power source. The connecting conductors are disposed so that the respective fields induced (which are orthogonal to the axis of the field induced from the array conductor), cancel each other out. The resulting magnetic fields extend along the field induced by the array conductor. In particular, as discussed below, equal and opposite current flows are created orthogonal to and at the end of each grid matrix conductor. The resulting radiated magnetic field is substantially uniform in amplitude and orientation over the entire length of the grid conductor, eliminating distorted magnetic fields from the connecting grid drive circuitry.

Figure 3:
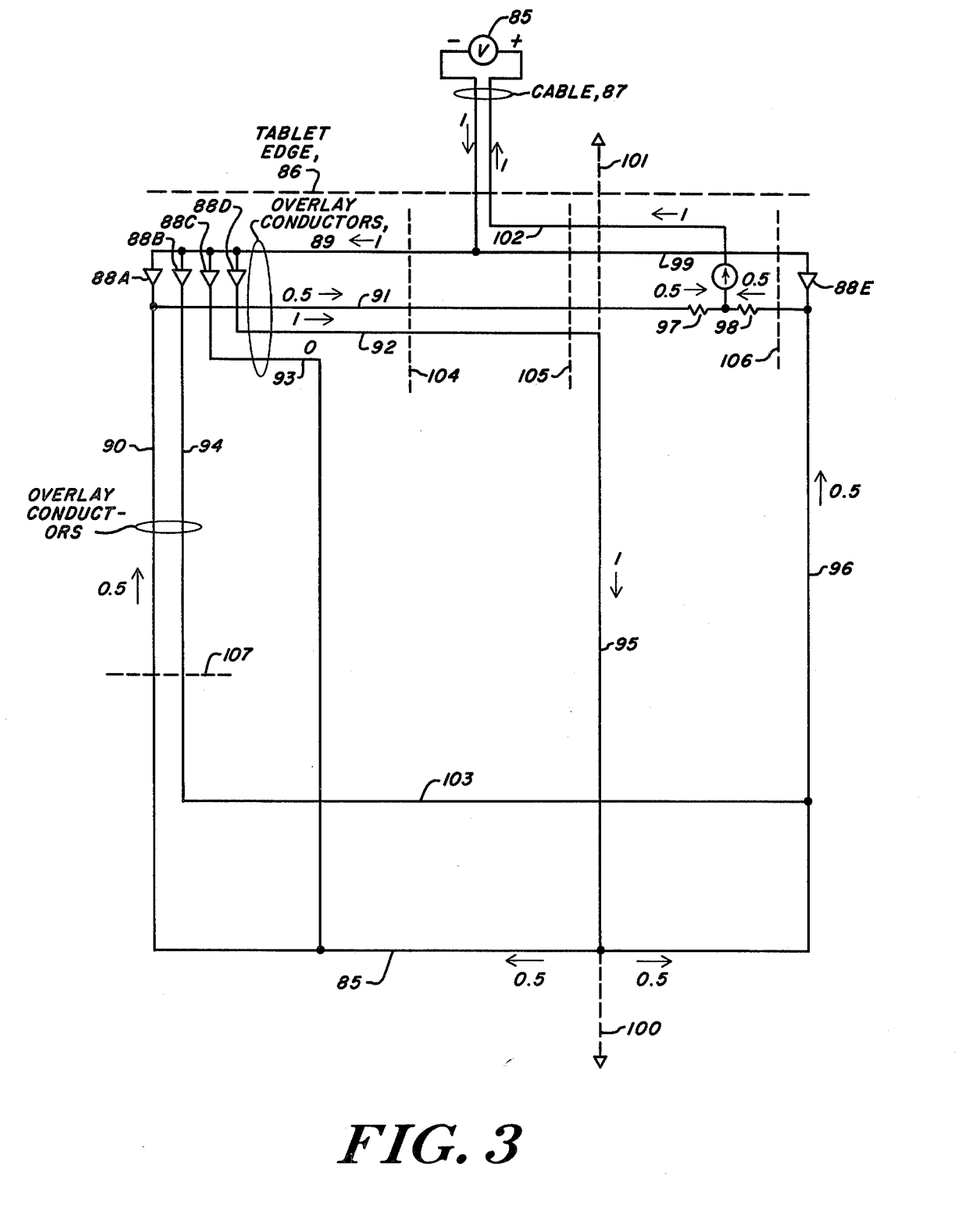
FIG. 3 is a drawing of the grid matrix current path symmetry of a central vertical conductor.

The simplified drawing of FIG. 3 shows the essential features of the balanced current matrix topology. The power source 85 is supplied to the tablet at the edge 86 via a closely paired cable 87, wherein the induced magnetic field from each power conductor is equal and opposite, thus cancelling each other. In the following explanation, only one grid conductor is energized at a time by a driver 88A, 88B, 88C, 88D and 88E, which has a maximum drive current of one (1) unit of current. Also, conductors 89, 91, 92, 93 and 102, and conductors 90 and 94 are placed on the circuit board to overlay or coincide as closely as possible. The grid drivers 88A, 88B, 88C, 88D and 88E are made selectively conductive as discussed in relation to the circuit of FIG. 7, discussed below.

In operation, a central vertical grid wire 95 is energized by driver 88D, causing the one (1) unit of current to flow as shown. The current flow splits into two equal currents in conductor 85 at the lower end of wire 95 to flow upwards through conductors 90 and 96, equal resistors 97 and 98, current regulator 99, and back through the return lead 102 of the power cable 87. The equal and opposite current paths through conductor 85 are orthogonal to the field of conductor 95, causing the direction of the created magnetic field to coincide with the conductor 95. Also, the combination of current flow at the upper end of the conductor 95 (along conductors 89, 91, 92 and 102) add to form equal and opposite current paths.

Figure 3A:
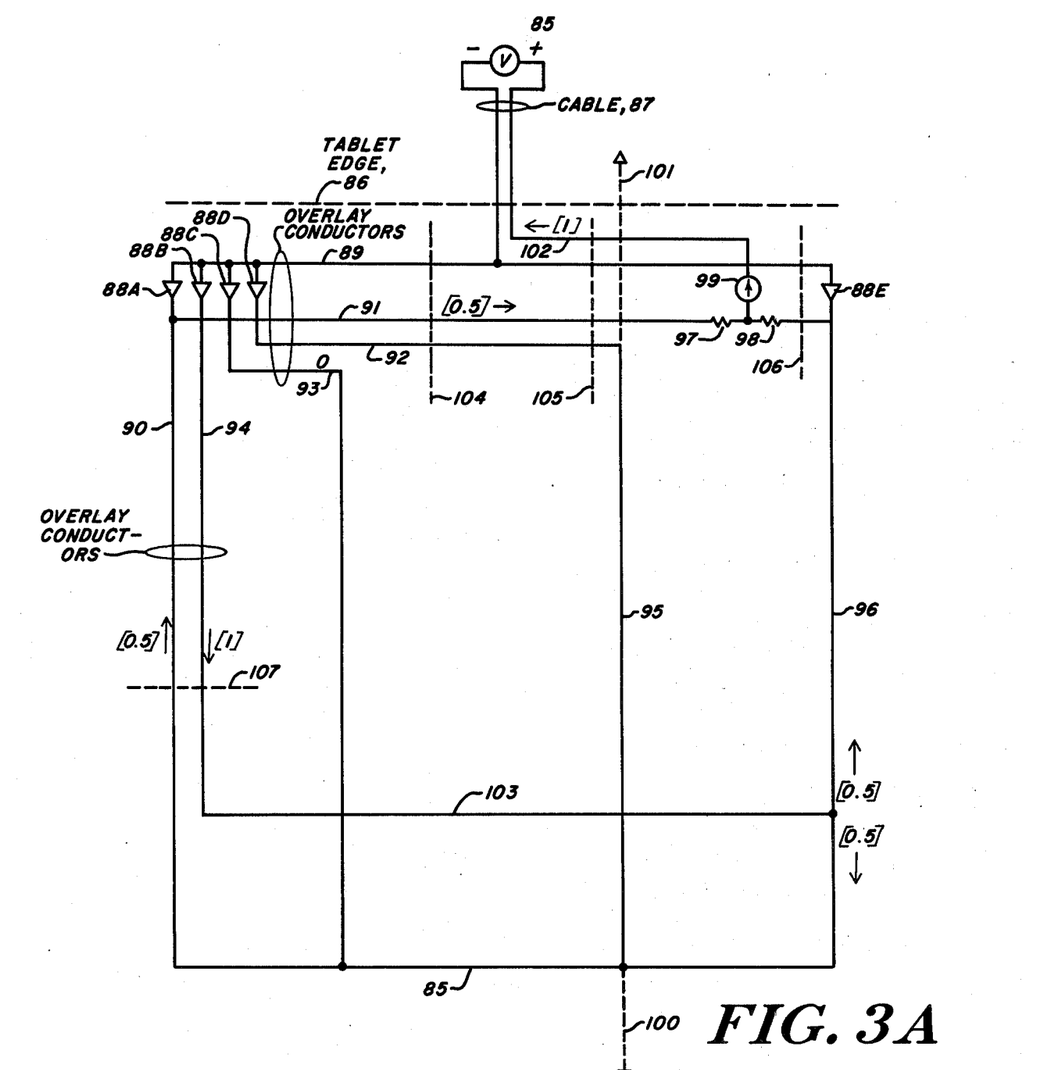
FIG. 3A is a drawing of the grid matrix current path symmetry of a central horizontal conductor.

A central horizontal grid conductor 103 is energized by conduction of the driver 88B, causing one (1) unit of current to flow therethrough, as shown in FIG. 3A. The current of conductor 103 splits onto two equal and opposite paths on conductor 96, resistors 97 (through conductors 85, 90 and 91) and 98, current regulator 99, and back through the return lead 102 of the power cable 87. The opposing current flow along conductor 96 and the combination of the field from the opposing current flow through conductors 90 and 94 induces a magnetic field around conductor 103, which at all positions along the conductor 103, including the ends, lies in a direction coequal with the lead 103 itself. Therefore, according to the first two examples of conductor energization the net current flow at typical locations 104, 105, 106 and 107 all add to 0.5 units of current, providing the 50/50 current split described, providing a magnetic field undistorted by the grid conductor 103 connecting conductors.

Figure 3B:
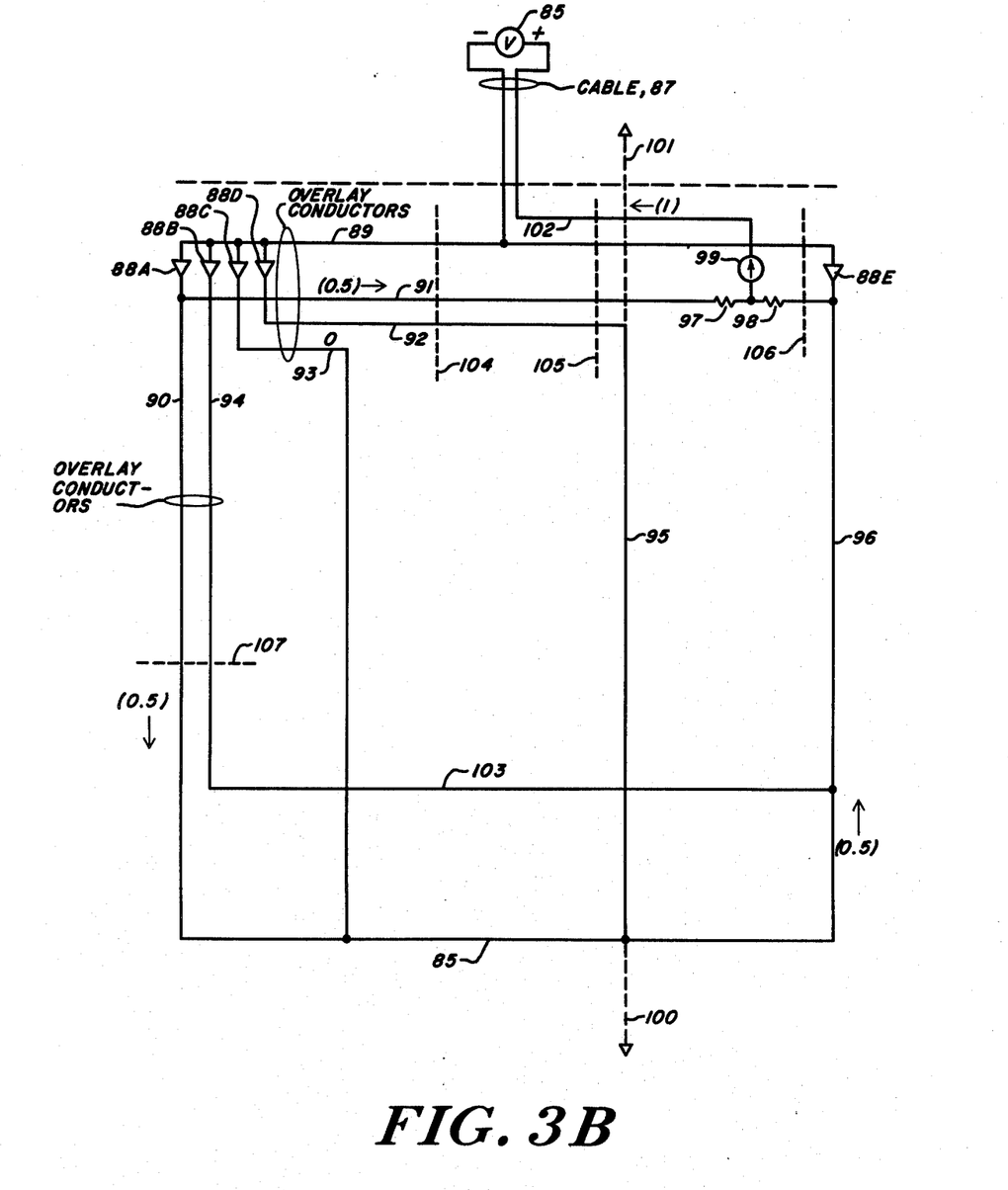
FIG. 3B is a drawing of the grid matrix current path symmetry of a peripheral conductor.

To energize a typical peripheral or edge conductor 90, driver 88A is made conductive, providing the current flow shown in FIG. 3B. A one-half unit of current flows through leads 90 and 91, and eventually through resistors 97 and 98, current regulator 99, and through the return lead 102 of the power cable 87. Although equal and opposite orthogonal current flows are not created when the edge conductor 90 is energized, the net current flow at locations 104, 105, 106 and 107 equals 0.5 unit, and the net current around the tablet periphery (including locations 104, 105 and 106) flows substantially in one direction (counter-clockwise in the example of FIG. 3B); an opposite (clockwise) flow of current is created when driver 88E is conductive.

Figure 4:
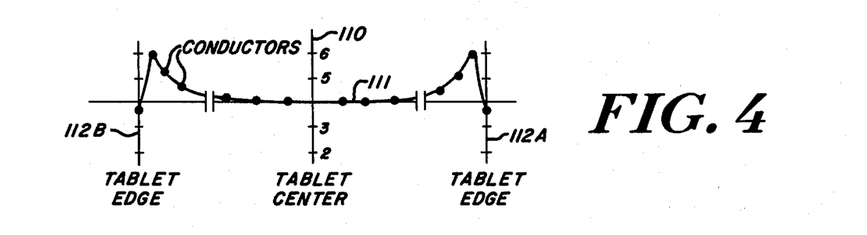
FIG. 4 is a curve showing the variation in conductor spacing along one grid array.

As mentioned above, the detected field signal is substantially uniform and symmetrical in the central area of the tablet grid matrix; however, in view of the filtering and averaging process used in the tablet decoder and discussed below, and the reduced (0.5 unit) current through the extreme edge conductor as discussed above, the conditioned sensor signal from the periodically pulsed magnetic field becomes less representative of the actual pickup 60 position as the pickup is moved towards the extreme edges 84 or 86. Also, at conductors near, but not at the periphery of the grid matrix, the return current flow (of 0.5 current as discussed above) tends to reduce the effective field induced by the driven wire. According to the present invention, it has found to be effective in improving the correlation of the pickup 60 position relative to the grid plane 78 by predistorting or varying the conductor-to-conductor spacing of the horizontal and vertical set of grid wires 90 and 92, respectively. According to the present invention, the regularity of the grid spatial interval, or conductor-to-conductor spacing is not held constant, but varied across each grid array direction. In particular as shown in FIG. 4 in the present embodiment, the center-to-center spacing (shown by the vertical coordinate 110 in tenths of an inch) is generally uniform in the central area 111 of the array, and increases toward each array edge 112A and 112B; however, in the preferred embodiment, the spacing at the tablet edge 112A and 112B diminishes to a spacing at or less than the spacing at the tablet array center 111. Each of the two orthogonal arrays forming the tablet matrix are distorted in this manner to provide the conductor paths shown in FIG. 5 and FIG. 6, discussed below. The exact amount of predistortion introduced into the grid wire matrix depends on the magnetic field pickup parameters of the pickup 60 and the low-pass filter response (discussed below) used in the decoding circuitry. The predistortion may be calculated or empirically determined. Predistortion introduced in the manner described improves the correspondence of the calculated coordinate values to the actual sensor location at any position over substantially the entire pad surface.

Figure 5:
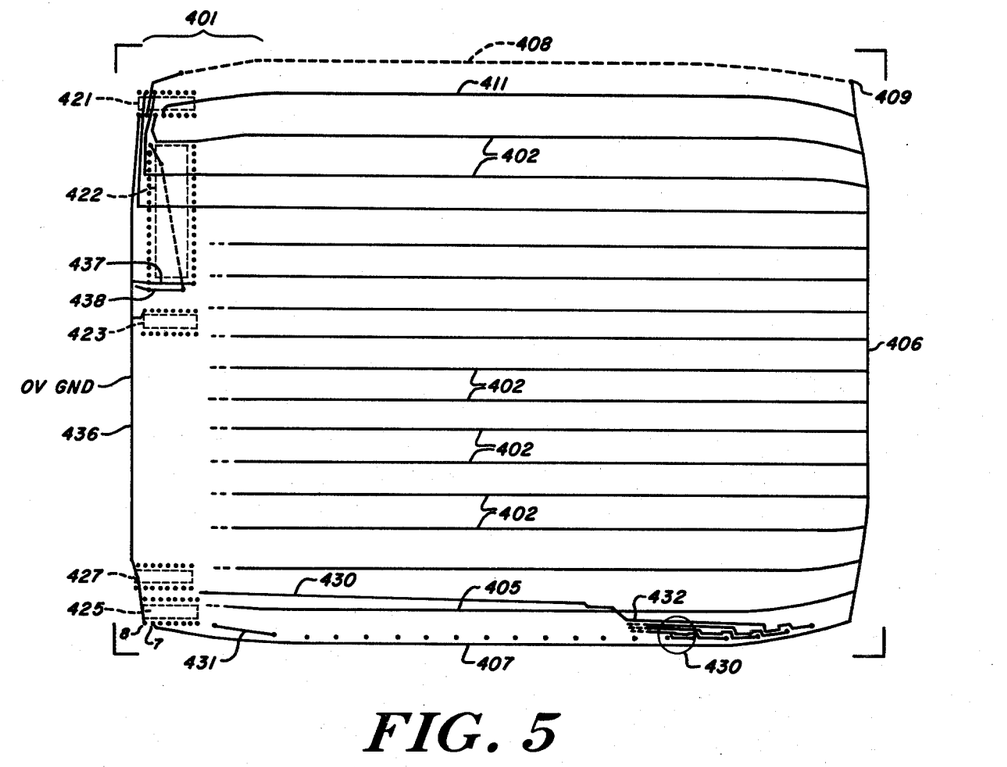
FIG. 5 shows the top surface of the tablet grid circuit including the tablet matrix drive and decode circuitry.
Figure 5A:
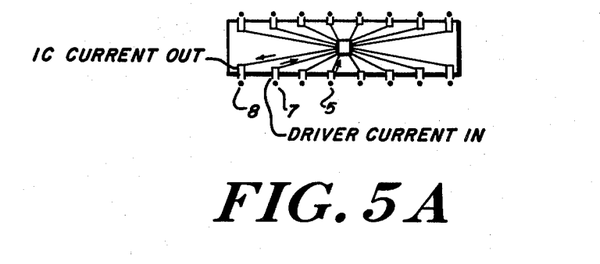
FIG. 5A shows the current flow within a line-driving integrated circuit internal lead frame.
Figure 6:
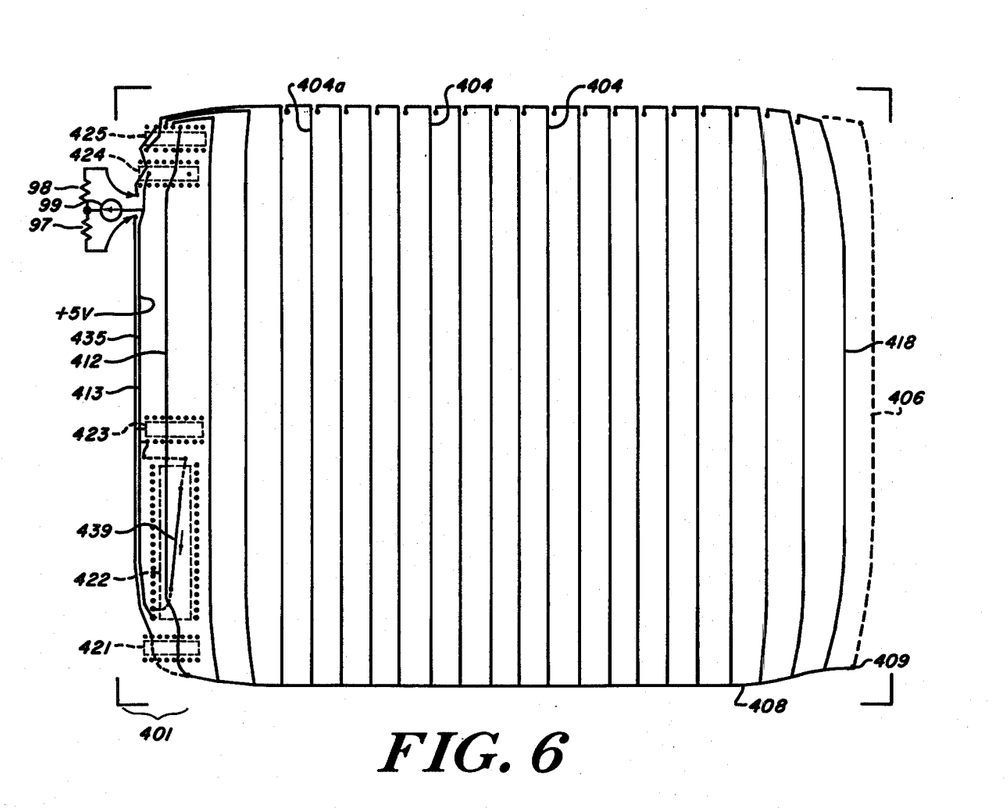
FIG. 6 shows the bottom surface of the tablet grid circuit including the tablet drive and decode circuitry.
Figure 6A:
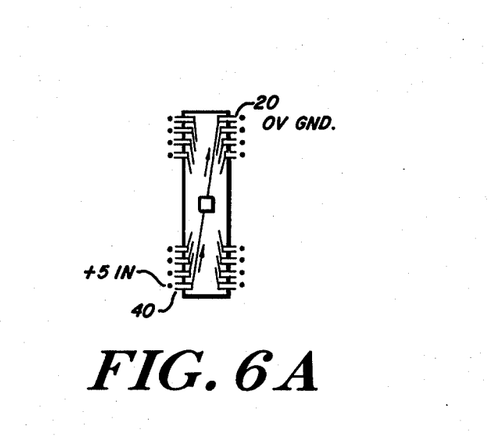
FIG. 6A shows this current flow through the power leads of an integrated circuit lead frame.

The actual implementation of the principles of balanced current matrix topology of FIGS. 3, 3A and 3B, and predistorted conductor spacing of FIG. 4 is shown in FIGS. 5 and 6 taken together to form the top and bottom surface of the grid matrix used in the preferred embodiment of the present invention. The matrix is typically implemented by a printed circuit board having conductive copper paths on both the top and bottom surface. In addition, the printed circuit board also incorporates the drive and decode circuitry at one end 401 of the printed circuit board. The additional grid conductor placement modifications made with respect to circuitry current flow and in particular with regard to the integrated circuit internal current flow as depicted by FIGS. 5A and 6A will be discussed below. With the circuit board shown in FIGS. 5 and 6 oriented so as to place the circuitry end 401 at the top (up), both surfaces depict a plurality of vertical 402 and horizontal 404 wires having a common end current return wire 406 and 408, respectively. The vertical 402 and horizontal 404 grid wires correspond to the grid wires 95 and 103 of FIG. 3; similarly, the current return wires 406 and 408 correspond with the conductors 85 and 96, also of FIG. 3. As shown in FIGS. 5 and 6, the conductor 402 and 404 spacings are fairly uniform in the central area, increasing towards each array edge. According to the graph of FIG. 4, the conductor spacing at the extreme edge of the tablet diminishes. This is seen as the spacing between conductor 405 and 407, conductors 411 and 408, conductors 418 and 406, as well as conductors 412 and 413. The conductor 406 terminates at one end with a feed-through connection 409 through the printed circuit board to connect with the other end of the feed-through 409 connected to conductor 408 on the other surface of the tablet. As visually apparent from FIGS. 5 and 6, the resulting implementation of the principles discussed above results in an orthogonal array of conductors having an interspacing distortion of a pincushion or barrel-shape. The vertical conductors shown in FIG. 5 extend upward into the integrated circuit area 401 to be connected to selected integrated circuits disposed therein. In general, it is reasonably possible to disperse the driver circuits (corresponding to drivers 88A–88E of FIG. 3) across the area 401 to minimize bunching of connecting conductors to one part of area 401. Details of further techniques to minimize stray or unwanted paths in this part of the circuit board are discussed below. The horizontal grid array, however, must be connected to the circuitry portion 401 by vertical connecting wires, shown as 430 in FIG. 5 which are connected to each of the respective horizontal conductive paths in FIG. 6 by conductive plated-through holes. It is according to the present invention that the connecting paths 430 connecting the horizontal conducting paths closer to the printed circuit area 401 have their connecting paths 430 aligned to closely overlay the tablet edge (as bounded by lead 407) as possible. In particular, it is important that the respective connecting paths 430 must closely overlay 407 in the area near their respective driven wire 404 and of less importance at locations more removed from the particular conductor 404. Consequently, each subsequent connecting paths 430 (for more distal horizontal conductive paths farther from area 401) are closely disposed to the adjacent connecting paths. Moreover, the conductive paths have successively increased spacing to the vertical lead 407 due to the intervening succession of vertical connecting paths. Therefore, the vertical connecting wires 430 are moved to the extreme edge as much as possible so that the effects of the added magnetic field from the connecting wires is removed (and cancelled) as much as possible from the area occupied by the horizontal wires 404, and as discussed in general with respect to FIG. 3, with respect to the overlay of conductors 94 and 90.

Since the integrated circuits consume measurable operating current, the power and ground connecting leads may influence the desired magnetic field. It is therefore part of the present invention to substantially overlay the power connection lead 435 with the current ground wire 436 to cause the induced currents of either wire to combine in a manner to reduce the unwanted field generated by the current flow to the integrated circuits disposed thereon. Moreover, branch distribution of current to individual circuits, such as shown by leads 437 and 438 to integrated circuit 422 are closely paired to cause the induced fields to cancel. Also to be considered in the current path topography are the currents generated by the power leads and other high current leads within the package of the particular integrated circuit, as shown by cutaway of integrated circuits in FIG. 5A and FIG. 6A discussed below.

According to the present invention it is also desirable to neutralize magnetic fields generated by current paths through the individual integrated circuit as shown in FIGS. 5A and 6A. The lead supports within integrated circuit 425 of FIG. 5 is shown in FIG. 5A. The integrated circuit has a power supply return on pin 8 which is then connected to conductor 436. The integrated circuit 425 comprises a plurality of drivers, such as shown as 88A–88E in FIG. 3, wherein the particular integrated circuit 425 driver for the conductor 407 is selected to have the internal lead structure wherein the separate current paths, e.g. from pins 7 and 8, will almost completely cancel spurious magnetic field induced from current flow from within the integrated circuit 425 itself. Similarly, for the next adjacent lead at 405, the next best section according to field cancellation within the integrated circuit 425 will be selected (according to the internal lead structure). As the conductors 402 become more distant from the integrated circuit 425, the cancellation becomes less significant.

In other cases, the internal lead structure of the IC may be optimally used by completing the desired topographic current path as with conductor 411 and IC 421, rather than canceling the (spurious) field induced by the lead structure. In integrated circuits which have the major current path through the power and ground pins such as pins 40 and 20 of the integrated circuit 422 in FIG. 6A, a current return conductor 439 is provided to most closely parallel and cancel (from the perspective of the sensor above the printed circuit board) the induced field from the interval integrated circuit 422 lead structure. In this manner, a balanced current path technique is maintained and unwanted power supply and/or signal induced magnetic fields are minimized.

It is according to the present invention, as discussed further below to reduce the effect of the field induced by the vertical connected wires 430 by sequentially energizing the outsidemost connecting wire 431 in sequence until the innermost (closest to the center of the digitizer tablet) connecting wire 432 is energized. As is discussed later in regards to the operation of the decoding circuitry, the decoding circuitry self-disables after the position of the sensor has been detected to prevent any false indication of spruious signals whether induced external to the tablet or by other signals within the tablet. In this manner, the induced field of an upper grid wire 404A is received earlier in time sequence as the outside (most distant from the digitizer tablet center) connecting wire 431 is energized before a lower grid wire 418 is energized by the inside connecting wire 432. According to the present invention, the particular connecting conductor 430 of each respective horizontal conductor 404 is positioned so that the field (created by the respective connecting conductor 430) received by the sensor near a particular horizontal conductor 404, appears at the edge of the tablet. Moreover, although the connecting conductor, e.g. 432, of the lower horizontal conductors, e.g. 418, progressively move inward on the tablet surface as the conductor path moves toward the area 401 of the tablet circuitry, the field generated by the more inward position of a connecting conductor (432) will be ignored by the decoding circuitry, since the position of the sensor in an upper tablet area (e.g. near conductor 431 and 404a) will first be detected, whereafter the subsequent fields (e.g. from conductor 432) will be ignored.

The circuitry 140 shown in FIG. 7 energizes the plurality of tablet matrix conductors 120 selectively driven by binary-to-decimal decoders 144, 146, 148 and 150 which typically comprise the circuit number 74LS145. Each output of the decoder is connected to one end of a single respective matrix conductor from among the matrix conductors 120. The opposite end of each matrix wire 120 is connected in common to a current return. As discussed above, the current return is split into two separate and equal current paths shown as 152 and 154 incorporating current balancing resistors 120 and 122 of equal value. The resistors are in turn driven by a selectively controllable current source formed by transistor 156, emitter resistor 158 and bias resistors 160 and 162. Furthermore, the base of transistor 156 and the bias resistors are bypassed by a capacitor 164 to limit the current rise and fall time produced by the switchable current source. The end of the bias resistor 160 is connected to two switch means 166 and 168 connected in parallel. When the switch means 166 and 168, typically a MOS integrated circuit CD4066B, are energized, a voltage is provided at the base junction of the transistor 156 which in turn causes a current to flow.

The switch means 166 and 168 as well as the decoders 144 through 150 are controlled by a microprocessor unit 170, typically part number 8048 or 8748 manufactured by Intel Corp. of Sunnyvale, Calif. and other manufacturers. The microprocessor 170 performs the sequential selection of the grid wires 120 according to a predetermined sequence. The sequence of energizing the grid wires through the particular sections of the decoder/driver circuits 144, 146, 148 and 150 is selected to facilitate the printed circuit layout and assembly according to the techniques discussed above in regard to FIGS. 3, 4 and 5.

The electromagnetic field emitted by the grid wires are in turn received by a movable sensor (54 of FIG. 1) pickup having the coil 172. The coil 172 in combination with capacitor 174 and resistor 176 form a broadly resonant bandpass filter circuit having a center frequency corresponding to the pulse rate on the grid matrix wires 120. Preferably, the matrix wires 120 are each energized by at least one pulse, which when taken together as a sequence of pulses (260 et seq. in FIG. 8) have a 50% duty cycle. Capacitor 178 is used to AC couple the input signal from the pickup coil and resistor 180 is used to bias the non-inverting input of amplifier 182 from a reference voltage being midway between the positive power and common ground of the amplifier; alternately, if the circuit were operated from dual power supplies, the reference potential would be zero volts (ground). This midpoint bias voltage is formed by a voltage divider comprising resistor 184 and 186 and is bypassed by capacitor 188. The operational amplifier 182 output is AC coupled to a synchronous rectifier by capacitor 202.

The synchronous rectifier is formed by switch means 196, 198 and operational amplifier 200 in a manner known in the art. The synchronous rectifier voltage gain of either +1 or −1 is controlled by the signal on lead 208 which also energizes the current source formed by transistor 156 and in turn the matrix wires 120.

The full wave action of the synchronous rectifier is used in the following manner. When any one of the matrix wires 120 are energized, a field flux change occurs, which induces a first signal in the pickup coil 172. When the pulse on the grid wire ceases, the generated magnetic field collapses, causing a signal generated by the coil in polarity opposite to the first signal. However, the second signal is again inverted by the full wave operation of the synchronous rectifier. In this manner, for each grid wire being selectively activated and deactivated before another wire is activated, two signal pulses of the same polarity are produced at the output of the amplifier 200, as shown in FIG. 8, 270 et seq. In addition, this synchronous full wave rectifier makes the filter easier to implement since a higher (second) harmonic of the induced signal is produced. Moreover, the full wave synchronous rectifier is less susceptable to extraneous noise signals and increases the energy of the received signal by two.

The operation of the pickup coil 172 in a broadly resonant mode in combination with the operation of the rectifier in a synchronous mode reduces the susceptibility of the circuit to extraneous signals. However, the filter resonant circuit should be sufficiently damped to avoid "ringing" which would cause the signal induced from the pulse of any one grid wire continue (in time) into the signal derived from the energization of the next grid wire. Therefore, the resistor 176 is selected to make the resonant circuit approximately critically damped.

As the pulsed magnetic field approaches the position of the pickup coil on the surface of the tablet, the pair of pulsating DC signals resulting from the synchronous rectifier will be of a particular polarity. As the pulsating magnetic field passes below the pickup coil, the polarity of the pair of pulses reverses. The present invention utilizes this polarity reversal in combination with other signals and information to determine the location of the pickup coil in relation to the energized grid wires.

The pulsating DC output from the synchronous rectifier is received by a low pass filter having a cutoff frequency lower than the period at which the grid wires are energized. The present invention uses a three-pole filter formed by amplifier 210, capacitors 212, 214 and 216 and resistors 218, 220, 222 and 224. The combination of these components form a low-pass filter of approximately constant time delay for frequencies within the filter bandpass, fully interpolating the individual wire pulses and producing a corresponding output signal; the particular values used are determined according to techniques known in the art of filter design. The filter output at 230 is received by a comparator 232. The comparator 232 and resistors 236 and 238 and diode 234 form a circuit which has hysteresis. The points at which the threshold occur which result in a change in comparator 232 output signal are at the reference voltage of approximately 2.5 volts, and at a voltage offset below the reference. The comparator output is received by an input of the microprocessor 170 as well as counter 240 enable inputs.

The microprocessor 170 also receives the inputs from the switch means 58 shown in FIG. 1. The switches here shown as 242, 244 and 246 provide contact closures whose signals are received by the microprocessor 170. The microprocessor also receives a communication clock signal along lead 248 for synchronous transmission of output data; in alternate asynchronous data output formats known in the art, the communication clock signal is not needed. The output is provided along a serial signal lead 250 from open-collector transistor 249 connected through resistor 251 to an output pin of microprocessor 170. The format of the output signal is not critical, and the coordinate data may be packed as desired. Techniques of formatting data sent from microprocessor is known in the art. The essential operation features of the microprocessor 170 for both the grid energization and the detection and decoding of the comparator 232 output to produce a representative coordinate signal is described below in reference to FIGS. 8 and 9.

A representative timing diagram of the signals occuring in the present invention is shown in FIG. 8 which for this figure has a grid array of only six (6) representative conductors. The wire current is shown by wave form 260 wherein each pulse is labelled with the respective wire to which it is directed. For example, the first pulse 261 is produced on wire 0, pulse 262 is produced on wire 1, and so forth. The pulse on wire 5 occurs twice, that being pulse 266 and pulse 267 for the particular effects described below. The output of the synchronous detector, corresponding to the output of amplifier 200, is shown by wave form 270 whose pulsating DC output corresponds to the periodic energization of the wire current. As the particular wire selected to be energized by the above-described current pulses approach the position of the pickup coil, the amplitude of the pulses of curve 270 increase until they reach a maximum as shown by peaks 272. As the subsequent selected wires appear beneath the sense coil, the polarity of the synchronous detector changes. If the wire energized by the current pulse is exactly centered below the pickup coil, the amplitude is zero; as the wire is moved off-center relative to the coil, the amplitude polarity corresponds to the direction of offset from center. Therefore, the pulses 274 correspond to a wire located almost immediately beneath the position of pickup coil. The pulses 276 correspond to wire positions on the opposite side of the pickup coil from the wires which induced pulses 272. As the wires further removed from the pickup coil are subsequently energized, the sensor signal amplitudes diminish. The average of the signal pulses crosses the zero reference or zero voltage line at point 280 and corresponds to the location of the pickup coil relative to the grid wires. Due to the difficulty of measuring the signal zero (reference point) transition, corresponding to a change in polarity, with a pulsating DC signal, a low-pass filter is used to provide a interpolating or averaging function of the pulsating DC voltage. The low-pass filter output at 230 in FIG. 7 is shown by curve 290. The parameters of the low-pass filter are selected to provide an average signal over a time period at greater than the pulse period of the pulsating DC output of the synchronous detector. The filter averages signals beyond the immediate vicinity of the sensor.

The pickup coil sensor receives no magnetic field beyond the edge of the tablet since there are no matrix wires beyond the edge of the tablet, whereas the coil senses several preceding and succeeding wire signals at the tablet center. According to the present invention, accurate position detection of the sensor in the vicinity of the edge wire, here taken to be wire 5, is enhanced by multiply pulsing the edge wire to produce signals which would be produced by grid matrix conductors beyond the edge of the tablet edge, so that the zero crossing of the filter output corresponds more accurately to the actual position of the sensor at the actual tablet edge. Although the exemplary FIG. 8 shows only the last (number 5) wire multiply pulsed, the preferred embodiment of the present invention multiply pulses the first wire scanned (in each grid array) three (3) times and the last wire scanned five (5) times. Moreover, alternate implementations may multiply pulse the first wire alone. Were not at least one of the wires multiply pulsed, either one or both ends of the filter time response to the sensor signal would be reduced in amplitude, erroneously shifting the polarity change zero (reference) crossing of the synchronous detector output.

The comparator 232 output is shown on curve 300, wherein the input threshold is crossed at point 294 on curve 290 and on curve 300. The comparator maintains the state until the zero crossing at point 292 occurs at which point the comparator returns to the initial state. The resolution of the present tablet is 220 counts per wire spacing, where the 220 counts correspond to 220 internal microprocessor clock periods between each wire. Upon transition 294 of the comparator, the microprocessor begins to count points when the next wire is de-energized shown as the transition at 296. The count continues until the zero threshold at 292 is traversed. Thus on curve 310, the interval between edge 296 and 292 corresponds in this instance to 390 counts. Simultaneously with the onset of point counting at transition 296, the wire counter 312 stops advancing. In this case, the wire counter stops at wire 2. The resulting position determined by the microprocessor corresponds to a product of the wire count times the number of clock periods per wire, in this case two times 220 or 440 counts, plus the number of points counted during the pulse interval shown by curve 310, or 390 counts. The result equals a value of 830 counts from the left-hand (in this case) margin. The left-to-right scan is necessary in this embodiment to allow the signal induced in the pickup to agree in polarity with the vertical (top-to-bottom) scan, which is predetermined according to the concern of connecting conductors 430, discussed above. Counter 240 of FIG. 7 is used in conjunction with microprocessor 170 to provide the necessary point counting bit capacity and speed, not found within the microprocessor 170; alternate embodiments having slower scan rates or lower resolution can be accommodated entirely within the microprocessor 170. The low-pass filter also has the characteristics of a time delay as shown by the difference in time between the zero crossing average of the pulses at 280 in curve 270 and the zero crossing at 292 of the low-pass filter output. To the position value of 830 counts, a numeric constant is subtracted to compensate for the filter delay time at 298. After transition 292 of the comparator 232, when the next conductor is energized, the microprocessor changes state to inhibit the circuitry, in particular the position counter, from further counting. Therefore, if a noise pulse were received and shown at 316 on curve 270 (and were filtered) a transition at 318 would occur. Thereafter, the point counter would otherwise again begin counting at transition 318 shown on curve 310 if and until the second transition occurs at sometime later 320. Thus, the erroneous information is prevented from accumulating as valid position information. Alternate embodiments of the present invention wherein the sensor position is determined by the number of counts from the second (reference or zero) comparator transition (292 of FIG. 8) to the final matrix conductor count value is within the scope of the present invention.

As the sensor is moved away from the plane of the tablet, for instance, at a distance greater than ten times the grid wire spacing, the output of the sensor becomes so reduced to provide inaccurate or unreliable operation of the tablet. Under conditions as these, the output of the comparator will not change state, such as 294 on curve 300 nor will the point counter change state for the duration of the time that the tablet is scanned. Therefore, if no comparator transition is noted for a predetermined length of time, the microprocessor suspends its previously sequential operation and begins to form a variety of self-diagnostic checks. Signals corresponding to the particular diagnostic determination are transmitted back to the external apparatus receiving the serial output; alternately, when in diagnostic mode, the microprocessor 170 could return a signal to correspond to a predetermined code indicating to the host system that the tablet is in diagnostic mode and not providing the current sensor position.

Figure 9:
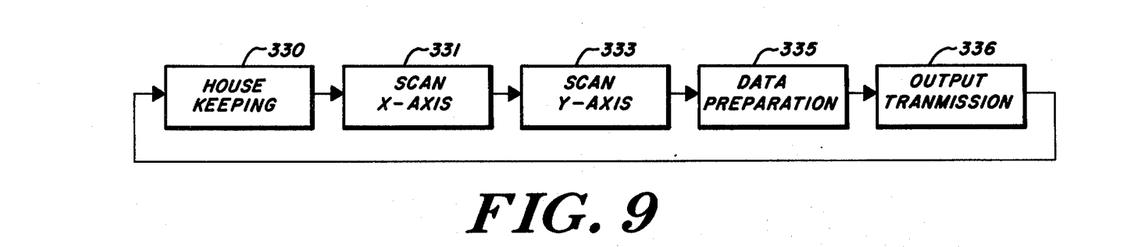
FIG. 9 is the main control program of the tablet.

The overall sequence of operation of the tablet according to the present invention is shown in FIG. 9 includes the housekeeping step 330, the scanning steps 331 and 333, the data preparation step 335, and the output transmission step 336. The housekeeping step 330 includes initialization of microprocessor registers and external counters in a manner generally known in the art, and not shown in detail. The scanning steps 331 and 333 are substantially identical except that each applies to a different axis. The data preparation step accumulates all the data and encodes it in the particular packing or output encoding fashion as desired, where the method and manner of method encoding is known in the art. The resulting data is then transmitted during the step 336. The preferred embodiment of this invention uses a serial output, however, another format, such as parallel output, is within the scope of this invention.

Implementation of the microprocessor program processes described above is within the skill of those in the art of software development. Similarly, the use of any one of several commercially available microprocessors also within the scope of the present invention and can be implemented by those in the field of microprocessor system development. Therefore, the above invention is not to be limited to systems implemented by a particular microprocessor or software package, or by the particular devices used and program routines described, except as described in the claims which follow.

What is claimed is:

1. A tablet providing coordinate location, comprising:
   an array of conductors disposed in a grid over the tablet area to create a first field when each said conductor is energized;
   means to selectively energize each conductor of said array of conductors;
   a sensor providing an output signal related to the first field proximate to said sensor; and
   decoder means responsive to said means to selectively energize and to said sensor signal output, wherein said decoder means provides a location signal representative of the coordinate location of said sensor relative to said array and wherein said array is predistorted to provide uniform correspondence between said location signal and the location of said sensor over the entire area of said grid.

2. The tablet of claim 1 further comprising a magnetic shield spaced from said array opposite from said sensor, and operable to confine said field.

3. A tablet including:
   an array of conductors disposed in a grid over the tablet area to create a first field when each conductor of said array of conductors is selectively energized;
   means to selectively energize each conductor of said array of conductors;
   a power source to supply energy to create said first field; and
   connecting conductors interconnecting each said array conductor to said means to selectively energize, and said power source, wherein an end of each said array conductor is connected to a plurality of connecting conductors, the plurality of connecting conductors being disposed to induce a second field having components to cause cancellation of second field components at angles non-parallel to said first field.

4. The tablet of claim 3 wherein said plurality of connecting conductors comprises two conductors, each perpendicular to said array conductor.

5. The tablet of claim 3 wherein said power source includes a current regulator.

6. The tablet of claim 4 wherein said two conductors each perpendicular to said array conductor comprises a common conductor having two ends, said common conductor being connected to each conductor of said array of conductors in said array.

7. The tablet of claim 6 wherein said common return comprises two return paths disposed along different edges of said area.

8. The tablet of claim 3 further comprising:
   a sensor providing an output signal related to the field proximate to said sensor; and
   decoder means responsive to said means to selectively energize and to said sensor signal output providing a location signal representative of the coordinate of said sensor relative to said array.

9. The tablet of claim 1 or 8 wherein said field created by the energization of each said conductor of said array of conductors comprises a magnetic field, said sensor comprises a magnetic coil in a magnetic circuit, and said array of conductors including said grid which provides a magnetic field when selectively energized by current flow therethrough.

10. The tablet of claim 9 wherein:
    said grid comprises two sets of element wires disposed orthogonally over said area to form a substantially rectangular matrix oriented along the two-dimension coordinate, wherein:
    said predistortion of said grid decreases the spacing of at least one set of said element wires which are disposed progressively farther from the tablet center and said predistortion includes progressively curving the ends of at least one set of the element wires inward toward the center of said rectangular matrix; and
    wherein said decoder means provides a two-dimensional signal representative of the location of said sensor over a rectangular area the length and width being defined according to the length of the orthogonal wires through the center of the rectangular matrix formed therefrom.

11. The tablet of claim 10 wherein the spacing for the most peripheral conductor is less than the maximum conductor spacing.

12. The tablet of claim 1 or 8 wherein:
    said means to selectively energize,
    said decoder means, and
    said array of conductors occupy a common support structure, the physical areas of each being shared by the other.

13. The tablet of claim 12 wherein said common support structure comprises a printed circuit board.

14. The tablet of claim 13 wherein said means to selectively energize and said decoder means includes connecting power leads producing induced fields, said power leads being disposed to substantially cancel the induced fields.

15. The tablet of claim 14 wherein:
    said means to selectively energize and said decoder means further include integrated circuits having associated induced fields induced by power flow through internal lead structure; and
    said power leads being further disposed to cancel the associated fields induced by the power flow through integrated circuit internal lead structure.

16. A method of position determination on a grid having a plurality of element conductors, comprising the steps of:
    sequentially selecting an element conductor of said grid to create a field thereabout, said element conductor being activated and deactivated before the next said element conductor is selected;
    sensing the field with a sensor providing an output relative to a detector position on said grid;
    rectifying the sensor output;
    filtering the rectifier output with a low-pass filter to provide an interpolated transition signal output;
    comparing the filtered rectifier output to a predetermined reference signal;

to provide an output signal upon the occurrence of a transition of said reference signal by said rectifier output; and measuring the elapsed time between the sequential selecting and said transition output signal, said elapsed time being representative of said sensor position on said grid.

17. The method of claim 16 wherein the step of sensing includes comparing the interpolated transition output to a predetermined threshold.

18. A method of position determination on a grid having a plurality of element conductors including a first conductor and a last conductor; said method comprising the steps of:

selecting said first element conductor;

multiply activating and deactivating said selected first element conductor before selecting another element conductor, to create a field thereabout;

sequentially selecting an element conductor following the selected first element wire;

activating and deactivating the selected element conductor before the next said element conductor is selected;

sensing a field with a sensor providing an output relative to a sensor position on said grid;

filtering the detector output with a filter to provide a smoothly interpolated signal output;

detecting the output transition of said interpolated signal output through a reference level with a detector; and measuring the elapsed time between said output transition and said selecting of one of said first and last conductor, said elapsed time being representative of the detected sensor position on said grid.

19. The method of claim 18 further comprising the step of selecting said last element conductor, and multiply activating and deactivating said last element conductor before activating another element conductor to create a field thereabout wherein spurious signals from connecting conductors is avoided.

20. The method of claims 17 or 19, further including the step of compensating the elapsed time signal by a time which includes a filter delay time to produce a compensated position output.

21. A digitizer tablet comprising:

a grid including a plurality of element wires;

means to select one among said element wires in a predetermined sequence;

means to activate said selected one element wire at a predetermined rate to create a field thereabout, wherein said means to activate deactivates said selected one element wire before the next said element wire is selected;

means to detect said field providing a field signal output;

filter means receiving said field signal output providing an interpolated output signal;

comparator means receiving said interpolated output signal and a reference signal, providing an output when said reference signal is transversed by said interpolated output signal; and decoder means receiving said comparator output and responsive to said means to select providing a location output representative of the means to detect position on said grid.

22. The tablet of claim 21 wherein:

said plurality of element wires includes a first wire and a last wire; and said means to active multiply activates and deactivates at least one of said first and said last wires before activating another element wire.

23. The tablet of claim 21 wherein said means to detect includes an inductor movable over the grid, and a resonant circuit including said inductor having a resonant frequency related to said rate of activation and deactivation of said element wires.

24. The tablet of claim 23 wherein:

said means to activate provides a current pulse having a 50% duty cycle at a frequency synchronous with said means to select;

said resonant circuit including means to damp to suppress ringing at the resonant frequency; and said means to detect includes a synchronous full-wave rectifier.

25. The tablet of claim 22 or 23 wherein:

said means to select operates at a rate; and said decoder means provides a position output signal as a combination of the highest sequential number element wire selected and the elapsed time corresponding to said rate from said highest sequential number element wire selected to the comparator output signal.

26. The tablet of claim 22 or 23 wherein:

said grid comprises element wires disposed in a two-dimensional coordinate system; and said decoder means provides an output representative of the detector position in said two dimensional coordinate system.

27. The tablet of claims 1, 8 or 21 further including:

out-of-range means determining when said means to detect said field is out of the active field area; and diagnostic means providing diagnostic tests of said tablet providing a diagnostic output on said position location output signal.

* * * * *